United States Patent [19]

Osendorf

[11] Patent Number: 4,963,171

[45] Date of Patent: Oct. 16, 1990

[54] HIGH EFFICIENCY FILTER AND METHOD OF FABRICATING SAME

[75] Inventor: Richard J. Osendorf, W. Saint Paul, Minn.

[73] Assignee: Donaldson Company, Inc., Minneapolis, Minn.

[21] Appl. No.: 430,734

[22] Filed: Nov. 2, 1989

[51] Int. Cl.$^5$ .............................................. B01D 46/10
[52] U.S. Cl. ........................................ 55/355; 55/497; 55/499; 55/500; 55/502; 55/521; 55/DIG. 31
[58] Field of Search ................. 55/355, 497, 499, 500, 55/502, 513, 510, 521, DIG. 31

[56] References Cited

U.S. PATENT DOCUMENTS

| | | |
|---|---|---|
| 2,111,448 | 3/1938 | Hoffman .................. 55/DIG. 31 X |
| 2,322,548 | 6/1943 | Sigmund . |
| 2,397,759 | 4/1946 | Sigmund . |
| 2,663,660 | 12/1953 | Layte . |
| 2,771,156 | 11/1956 | Kasten et al. . |
| 2,792,906 | 5/1957 | Evans . |
| 3,494,113 | 2/1970 | Kinney .............................. 55/500 X |
| 4,227,953 | 10/1980 | Wasielewski . |
| 4,373,635 | 2/1983 | Mules . |
| 4,493,717 | 1/1985 | Berger et al. . |
| 4,584,005 | 4/1986 | Allan et al. . |
| 4,639,261 | 1/1987 | Pittman et al. . |
| 4,685,944 | 8/1987 | Allan et al. . |
| 4,885,015 | 12/1989 | Gouley et al. ........................ 55/497 |

Primary Examiner—Charles Hart
Attorney, Agent, or Firm—Merchant, Gould, Smith, Edell, Welter & Schmidt

[57] ABSTRACT

A high efficiency filter assembly having a generally rectangular pleated filter element with ends defined by the pleated edges of the element and sides defined by generally planar side edges of the element. The filter element is mounted in a generally rectangular housing formed by two pairs of oppositely disposed frame members that are joined together. Each frame member has a planar base member and a pair of upright side member defining an open ended channel to receive the ends and sides of the filter element. At least one spacing member extends along the base portion to space the ends and sides of the filter element from the surface of the planar member. A dam member is provided at each end of one of the pairs of planar members to enclose the channel, and a sealant is disposed in the channel and the ends of the filter element are embedded in the sealant.

15 Claims, 2 Drawing Sheets

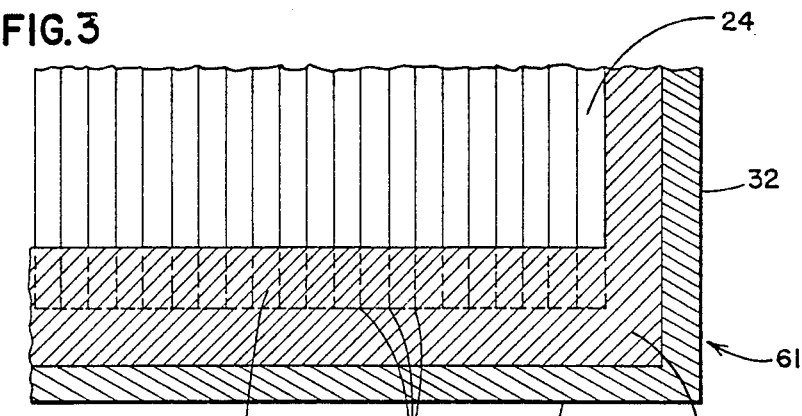
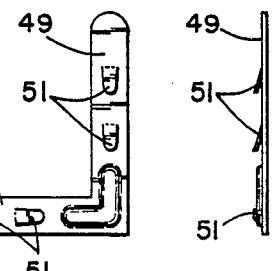
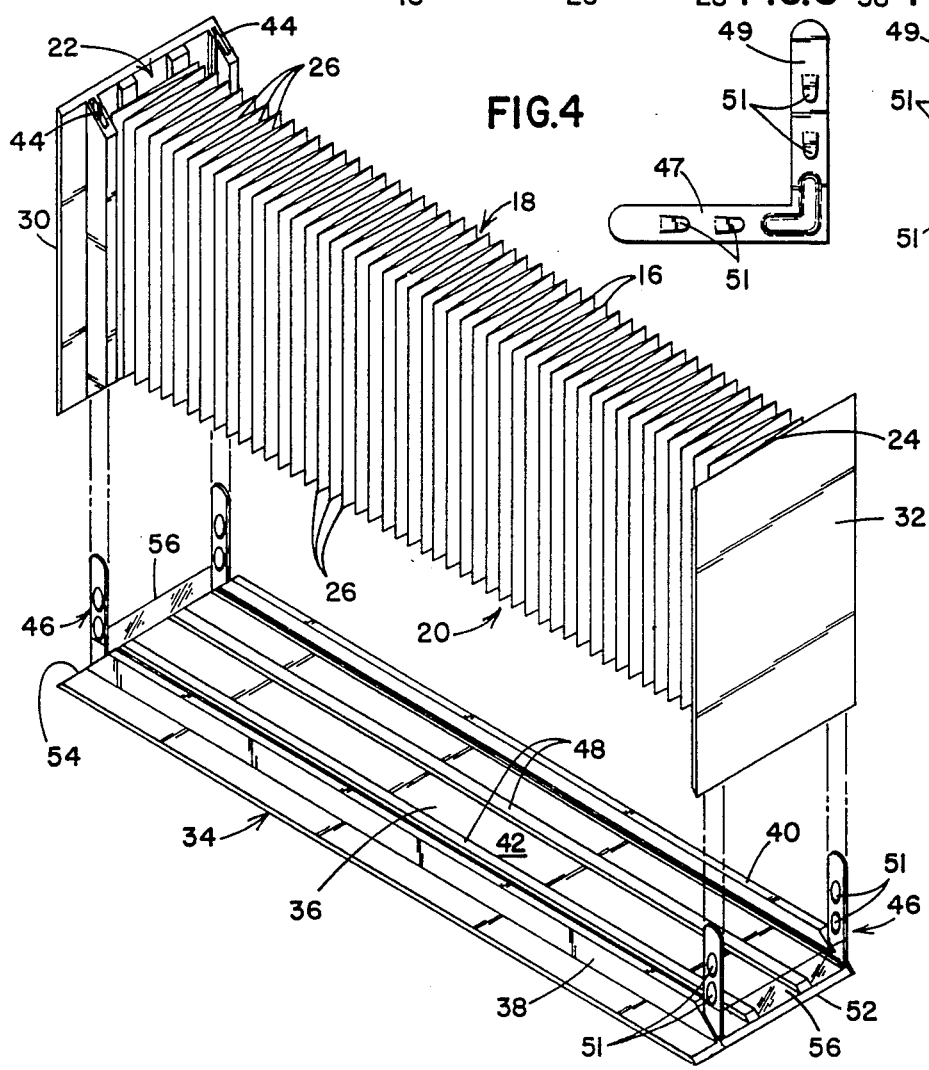

HIGH EFFICIENCY FILTER AND METHOD OF FABRICATING SAME

BACKGROUND OF THE INVENTION

The present invention relates to an improved air filter assembly and a method of fabricating that assembly. In particular, the present invention is directed to improved high efficiency and ultra high efficiency particulate air filters and assembly process for these types of filters. High efficiency particulate air (HEPA) filters have a particle removal efficiency of at least 99.97% for particulates of 0.3 microns. Ultra high efficiency filters have efficiencies of at least 99.9999% for 0.12 micron particulates.

HEPA filters find a wide variety of applications including filtration systems for laboratory and clean room environments where even the smallest amount of particulate in the air is unacceptable. Other typical applications include the filtration of hazardous materials, such as radioactive or biologically harmful materials, from a contaminated air stream before exhaustion of the air to the atmosphere. The prior art HEPA filters typically are constructed utilizing a pleated element of a suitable material in a generally rectangular configuration. The filter element is housed in a rectangular frame comprising four frame members joined together and in which the edges of the filter element are sealed. The frame members can be of any suitable material and typically may be extruded metal or plastic. Prior art HEPA filters of this type are disclosed in U.S. Pat. Nos. 4,685,944; 4,584,005; and 4,227,953.

The prior art HEPA filters are typically assembled by constructing the frame around the filter element. For example, one of the frame members may be filled with an epoxy or sealant in a liquid or viscous state. The filter element is then placed on the frame member with one edge of the element immersed in the epoxy which is then allowed to hardened. The process is then repeated for the oppositely disposed frame member. Then in a similar fashion the filter element is bonded to the two other frame members and the frame members secured together in some manner.

Prior art HEPA filters fabricated according to conventional processes have experienced leaks between the filter element and the frame. Such leaks commonly occur at the corners where adjacent frame members are joined. It is believed that one cause of these leaks is an uneven distribution of the epoxy caused when the epoxy is displaced as the filter element is inserted in the frame member during the assembly process. It can be appreciated that even a relatively small leak could totally destroy the filter efficiency and render it useless.

The present invention is an improved HEPA filter structure and method of fabricating that structure so as to eliminate leaks and in particular the corner leaks that have developed in the prior art. Moreover, the fabricating method and new structure simplifies assembly. In building the filter frame around the filter element in the prior art the step of inserting the filter element in the viscous epoxy or sealant often caused sealant to be pushed out the ends of the frame members overflowing the end of the frame member intended to be joined to an adjacent frame member. Thus, during assembly this displaced epoxy had to be removed by suitable solvent not only for aesthetic reasons in the appearance of the final filter structure but also to ensure that a proper fit was achieved between adjacent filter members at the corners of the assembly. In the method of the present invention, the necessity for this relatively messy solvent clean up step in the fabrication process is eliminated.

SUMMARY OF THE INVENTION

The present invention is an improved filter assembly and method for fabrication of such an assembly. The assembly includes a generally rectangularly pleated filter element mounted in a housing that comprises four frame members. Each frame member has a generally planar base with a pair of upright members which define a channel for receiving one end of the rectangular filter element. There is provided a means for spacing the end of the filter element from the surface of the member. A sealant is disposed within the channel to bond and seal the end of the filter element to the frame member. Further, there is a dam means disposed at each end of an oppositely disposed pair of the planar members which functions to retain the sealant within the channel of the frame member while it is in its viscous state during assembly. Finally, there is a means for joining the frame members together to form a generally rectangular housing.

In the preferred embodiment the spacing means is at least one rib extending along the surface of the channel from one end of the frame member to the other. The spacing means insures that as the end of the filter element is inserted in the channel during assembly the epoxy will not be displaced so as to cause voids or holes in the bond between the filter element and the frame member. In other words, the end of the filter element cannot be forced against the surface of the frame member where it could displace substantially all of the epoxy at certain locations and thus create areas of weak or insufficient bonding. The spacing means insures a substantial layer of epoxy in which the ends of the filter elements are embedded and bonded to the frame member.

Also in the preferred embodiment of the filter assembly of the present invention the dam means is a two-sided adhesive tape which extends across the open ends of one pair of the frame members to form an enclosed channel in which the viscous sealant may be deposited. The dam means serves to retain sealant within the channel defined by the planar base member and its upright members during assembly and prevent the displacement of the epoxy over the ends of the frame member where it must be subsequently cleaned.

In the method of the present invention, a generally rectangular pleated filter element is provided having opposite ends defined by the pleated edges of the element and side edges defined by the generally flat or planar ends of the element. First and second pairs of frame members are provided with each frame member having a planar base and upright side members defining a channel with open ends. Means are provided on the base of the frame member for spacing the side edges and ends of the filter element from the surface of the base.

The method includes building a U-shaped frame by joining the side members of the frame to the bottom member. The channel in the bottom member is filled with a sealant in a liquid or viscous state. The filter element is inserted in this partially assembled frame with its pleated edges at one end of the element immersed in the sealant and spaced apart from the surface of the bottom member by the ribs and with its flat sides in the channels of the side frame members. Ribs also space the flat sides of the element from the surface of the frame member. The sealant in the bottom frame member is allowed to harden. Then the top frame member is joined in a similar manner to the side frame members to complete the assembly. The channel of the top frame member is filled with sealant in its viscous state. The top pleated ends of the filter element are immersed in the sealant which is retained in the channel by the adhesive tape dam members. The ends of the side frame members engage the tape and fold it inwardly upon itself immersing the tape in the sealant as the ends of the side members and top member are joined together. The sealant is allowed to harden. The assembly is completed by depositing additional sealant to the extent necessary in the channels of the side members to ensure a seal between the sides of the element and the frame side members.

The present invention provides an improved filter assembly fabricated by a simpler, cleaner, less timely and less costly method than the prior art. The resultant filter assembly itself has a more effective seal between the filter element and frame in which it is mounted eliminating the propensity demonstrated in the prior art to develop voids in the sealant between the filter element in the housing and, in particular, at the corners of the assembly. These and other advantages of the present invention will become apparent with reference to the accompanying drawings, detailed description of the preferred embodiment, and claims.

BRIEF DESCRIPTION OF THE DRAWINGS

FIG. 3 is an enlarged partial view in cross-section taken generally along the line 3—3 of FIG. 1;

FIG. 4 is an exploded partial view in perspective of the filter assembly;

FIG. 5 is a plan view showing the structure of the retaining clips used in the present invention;

FIG. 6 is an elevational view of the retaining clip.

DETAILED DESCRIPTION OF THE PREFERRED EMBODIMENT

Figure 1:
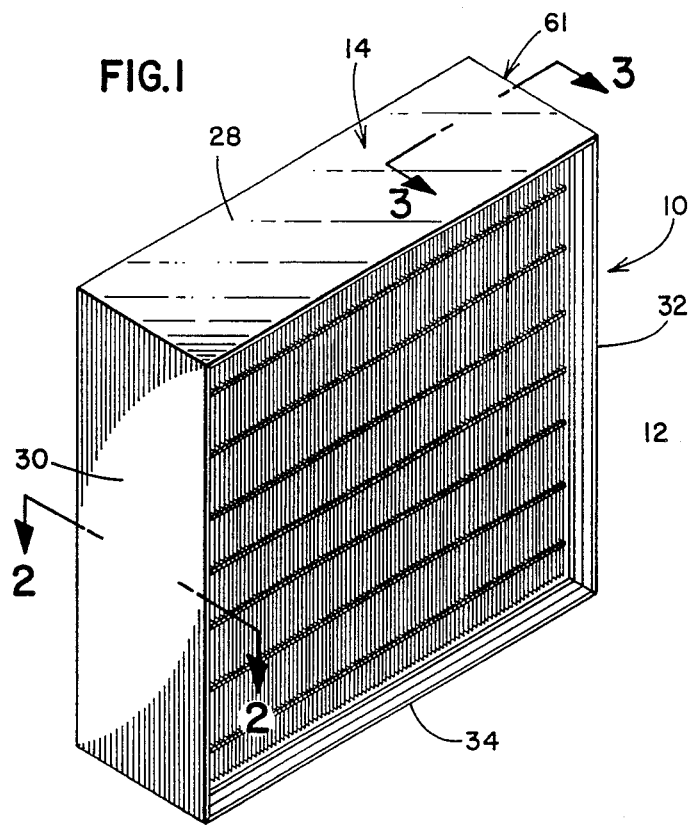
FIG. 1 is a view in perspective of the filter assembly of the present invention.

Referring to the drawings wherein like numerals represent like parts throughout the several views, the filter assembly of the present invention is illustrated generally at 10. Filter assembly 10 includes a pleated filter element 12 mounted in a housing 14. Pleated element 12 may be constructed of any suitable filter media, such as fiberglass, which is folded in an accordion-like fashion to form pleats as at 16. The pleated element 12 is generally rectangular in shape. To facilitate discussion, pleated element 12 will be described as having top and bottom ends 18 and 20 and sides 22 and 24 although it should be understood that this nomenclature could as easily be reversed without departing from the invention. Ends 18 and 20 have edges, for example as shown at 26, intended to be embedded in a sealant as will be described in more detail later in this discussion. Sides 22 and 24 of element 12 are relatively flat sheets of media as shown in more detail in FIG. 2.

Figure 2:
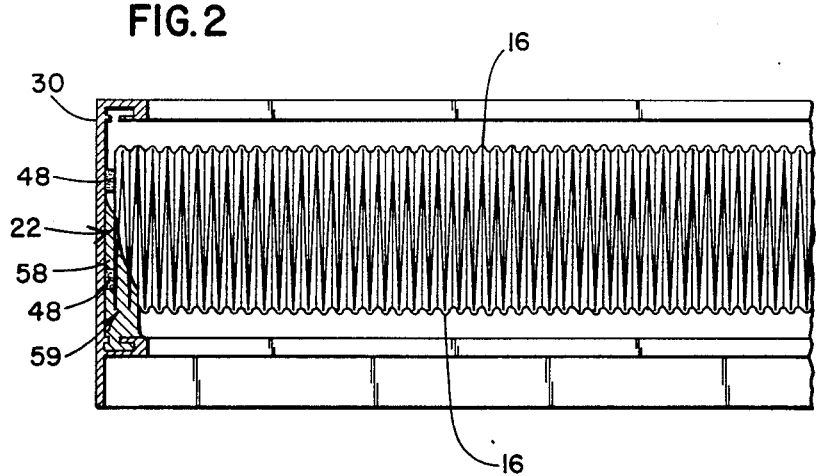
FIG. 2 is a partial view in cross-section taken generally along the line 2—2 of FIG. 1.

Housing 14 includes top and bottom frame members 28 and 34 and side frame members 30 and 32 which are in the preferred embodiment extruded aluminum. Ends 18 and 20 of element 12 are mounted in top and bottom frame members 28 and 34, respectively, while sides 22 and 24 are mounted in side frame members 30 and 32, respectively. Frame member 34 will now be described in more detail, it being understood that frame member 28 has the same construction. Frame member 34 includes a planar base member 36. A pair of upright parallel side members 38 and 40 extend from planar member 36 to define a generally U-shaped open ended channel at 42. Upright members 38 and 40 have slots formed therein (as shown in more detail at 44 with respect to frame member 32) for receiving retaining clips 46. Clips 46 include portions 47 and 49 joined at right angles for insertion into slots 44 in upright side members 38, 40 of adjacent frame members as shown in more detail in FIG. 4. Clips 46 are adapted for frictional fit within slots 44. This frictional fit is achieved at least in part by tangs 51 which are punched out of portions 47 and 49. Tangs 51 are oriented so as to allow easy insertion of portions 47 and 49 into slots 44, but to resist the opposite motion. In the embodiment shown in the drawings, frame member 34 has a pair of ribs 48 on the surface of planar base member 36 and extending between the ends thereof. Frame member 34 has beveled ends 52 and 54 that mate with adjacent beveled end of frame members 32 and 30, respectively, to form a mitered joint. Frame member 28 is similarly joined to frame members 30 and 32. Extending across ends 52 and 54 of frame member 34 and attached to clips 46 are dam members 56 which serve to enclose the open ends of channel 42. Similar dam members are attached to clips 46 of frame member 28. Ribs 48 serve to space edges 26 of ends 18 and 20 and sides 22 and 24 of pleated element 12 from the surface of planar members 36. In the preferred embodiment, dam members 56 are a double sided adhesive tape. As shown in more detail in FIG. 3, ends 18 and 20 of pleated element 12 are embedded in a suitable sealant 58 which functions to bond pleated element 12 to frame members 28 and 34 and seal pleated element 12 in housing 14. Also, sealant 58 is provided in sufficient quantity in channels 42 of frame members 30 and 32 to seal sides 20 and 24 of element 12. As illustrated in FIG. 2 it is not necessary to have the entire surface of sides 20 and 24 embedded in sealant 58, but only to provide enough to completely seal a corner of the assembly as at 59. Sealant 58 may be any suitable material, such as an epoxy or urethane, which can be deposited within channel 42 in a liquid or viscous state and then allowed to harden. Side frame members 30 and 32 have a structure identical to that described with respect to frame members 28 and 34 except that neither has dam members 56.

In the prior art filters of the type described herein, leaks tend to occur where voids are created as a result of the displacement of sealant when the filter element is inserted in the frame member and forced against the planar surface of the frame member thus displacing the sealant. This phenomenon occurs most frequently at the corners of the filter assembly. In the present invention, the spacing means or ribs 48 prevent the ends 18 and 20 and sides 22 and 24 from directly contacting the surface of the planar members of the frame. Thus, as shown in more detail in FIG. 3, in the present invention a substantial amount of sealant 58 remains between frame members 28 and 32 and end 18 and side 24 of filter element 12 along the corners as at 61 ensuring both an effective bond and seal between element 12 and frame members 28, 30, 32 and 34. As shown in FIG. 3, edges 26 of element 12 are totally and uniformly immersed and embedded in sealant 58. No sealant voids can be generated during assembly utilizing the structure of the present invention.

The method of fabrication of filter assembly 10 will now be described. First, a pleated element 12 folded in accordion-like fashion into a generally rectangular shape is provided. In the preferred embodiment frame members 30 and 32 are mounted to frame member 34 by sliding clips 46 into slots 44 until the beveled edges of the frame members are joined together. The exterior surface of dam members 56 may be provided with a sealant, such as a silicone adhesive. During assembly the edges of frame members 30 and 32 engage dam members 56 and fold the adhesive tape inwardly upon itself. The tape and silicone adhesive provide a tight seal at the corners of the frame to retain a sealant 58 which is then deposited in a viscous or liquid state into channel 42. Pleated element 12 is then inserted in the U-shaped frame with edges 26 resting upon ribs 48 and spaced apart from the surface of frame member 34. Edges 26 are immersed in sealant 58 which is then allowed to harden. The assembly is next mounted to frame member 28. Frame member 28 is disposed with channel 42 facing upward. Sealant 58 in its viscous state is deposited in channel 42 of frame member 28. Dam members 56 retain sealant 58 within channel 42 as edges 26 of filter element 12 are inserted in the sealant. The beveled top ends of frame members 30 and 32 engage the dam members 56 and fold the adhesive tape inwardly upon itself immersing the tape in the sealant 58 which is allowed to harden. Additional sealant 58 may be deposited as needed in channels 42 of side members 30 and 32 to effect a seal between sides 22 and 24 of element 12 and side member 30 and 32, respectively. As shown in FIG. 2 channels 42 of side members 30 and 32 do not have to be completely filled with sealant to accomplish this purpose.

From the above description, it will be apparent that the filter assembly and fabrication method of the present invention provides improved HEPA filter eliminating leakage problems associated with prior art and in particular the propensity of the prior art to develop leaks at the corners of the frame assembly. The present invention accomplishes this result without the need for complex frame structure and with a relatively simple process that eliminates time consuming clean up of sealant that in the prior that tended to spill onto unwanted services of the assembly.

What is claimed is:

1. A filter assembly comprising:
    A generally rectangular pleated filter element with opposite end edges defined by the pleated edges of said element and opposite side edges defined by the generally planar side edges of said element;
    a housing in which said filter is mounted, said housing having first and second pairs of oppositely disposed frame members, each of said first pair of frame members comprising a generally planar base member and a pair of upright members defining a channel for receiving one of said end edges of said filter element, means for spacing said filter element from the surface of said planar member, and a means disposed at each end of said planar member for retaining a sealant in a viscous state within said channel during assembly, each of said second pair of frame members comprising a generally planar base member and a pair of upright members defining a channel for receiving one of said side edges;
    sealant means disposed within said channels for bonding said filter element to said frame members and sealing the interface between said filter element and said frame members;
    means for joining said frame members together to form a generally rectangular housing.

2. A filter assembly in accordance with claim 1 wherein said spacing means comprises at least one rib extending along the surface of said planar member between the ends thereof.

3. A filter assembly in accordance with claim 1 wherein each of said second pair of frame members has a means for spacing said filter element from the surface of said planar member.

4. A filter assembly in accordance with claim 3 wherein said spacing means comprises at least one rib extending along the surface of said planar member between the ends thereof.

5. A filter assembly in accordance with claim 1 wherein said dam means comprises a two-sided adhesive tape.

6. A filter assembly in accordance with claim 1 wherein said upright members on said first and second pairs of frame members have slots formed therein and wherein said joining means further comprises retaining clips having right angle members received within said slots.

7. A high efficiency air filter comprising:
    a generally rectangular pleated filter element having oppositely disposed pleated ends and oppositely disposed substantially planar flat sides;
    first and second pairs of oppositely disposed frame members defining a generally rectangular housing for said filter element, each frame member comprising: a planar base member and upright side members defining a channel in which the ends or sides of said filter element are mounted, at least one rib member extending along the surface of said planar member between the ends thereof, one of said pairs of frame members having a dam member extending across each end of said planar members of said pair;
    a sealant disposed within each of said channels of said frame members and in which the ends and sides of said filter element are embedded to bond said filter element to said frame members;
    means for connecting said frame members together.

8. A method for fabricating a filter assembly comprising the steps of:
    providing a generally rectangular pleated filter element with opposite ends defined by the pleated edges of the element and opposite sides defined by the generally planar edges of the element;
    providing first and second pairs of frame members in which the sides and ends, respectively, of the pleated filter element are to be mounted, each of said frame members having a planar base member and upright side members defining a channel with open ends and means on said base portion for spacing the sides and ends of the filter element from the surface of said base member;
    bonding the sides of the filter element to the first pair of frame members with the bond sealing the interface between the sides and said first pair frame members;
    bonding the ends of the filter element to said second pair of frame members, said bonding further comprising steps of:

providing a dam member across the open ends of each of said second pair of second frame members;

depositing sealant in a viscous state in the channel enclosed by said dam members;

inserting the ends of the filter element into the viscous sealant;

allowing the sealant to harden with the ends of said pleated element embedded within the sealant;

joining said first and second pairs of frame members together to form a generally rectangular housing.

9. A method fabricating a filter element in accordance with claim 8 wherein said dam member is collapsible.

10. A method in accordance with claim 9 wherein said collapsible dam member is a two-sided adhesive tape.

11. A method in accordance with claim 8 wherein said upright members have slots formed therein and the step of joining said first and second pairs of frame members together further comprises providing retaining clips having a first portion frictionally received within the slots of the upright members of said first pair of said frame members and a second portion frictionally received within the slots on said upright members of said second pair of said frame members.

12. A method in accordance with claim 11 wherein the step of joining the first and second pairs of frame members further comprises the step of inserting said second portions of said clip members into said slots in said upright members of said first pair of said frame members.

13. A method in accordance with claim 12 wherein the step of joining said first and second pairs of said frame members together further comprises the step of collapsing said dam member between the ends of said first and second pairs of frame members with said dam member embedded in said sealant.

14. A method for fabricating a filter assembly comprising the steps of:

providing a generally rectangular pleated filter element with opposite ends defined by the pleated edges of the element and opposite sides defined by the generally planar edges of the element;

providing first and second pairs of frame members, each of said frame members having a planar base member and upright side members defining a channel in which the pleated element is disposed and means on said base member for spacing the pleated element from the surface of said base member; each of said first pair of frame members having dam members at the opposite ends thereof;

constructing a U-shaped frame by joining said second pair of frame members to one of said first pair of frame members;

depositing sealant in a viscous state in the channel of said one of said first pair of frame members;

inserting the filter element in the U-shaped frame with one end of said element immersed in said sealant and the sides of said element disposed in the channels of said second pair of frame members;

allowing said sealant to harden;

depositing sealant in a viscous state into the channel of the other of said first pair of frame members;

joining said other of said first pair of frame members to said second pair of frame members with the other end of said filter element immersed in said sealant in the channel of said other of said first pair of frame members;

allowing said sealant in said other of said first pair of frame members to harden.

15. A method in accordance with claim 14 further comprising the step of depositing sealant in the channels of said second pair of frame members in an amount sufficient to seal the sides of the filter element to the second pair of frame members.

* * * * *